3,011,341
ROCKET EXCITED WIND TUNNEL
Freeman K. Hill, Bethesda, Md., assignor to the United States of America as represented by the Secretary of the Navy
Filed July 15, 1958, Ser. No. 748,772
3 Claims. (Cl. 73—147)

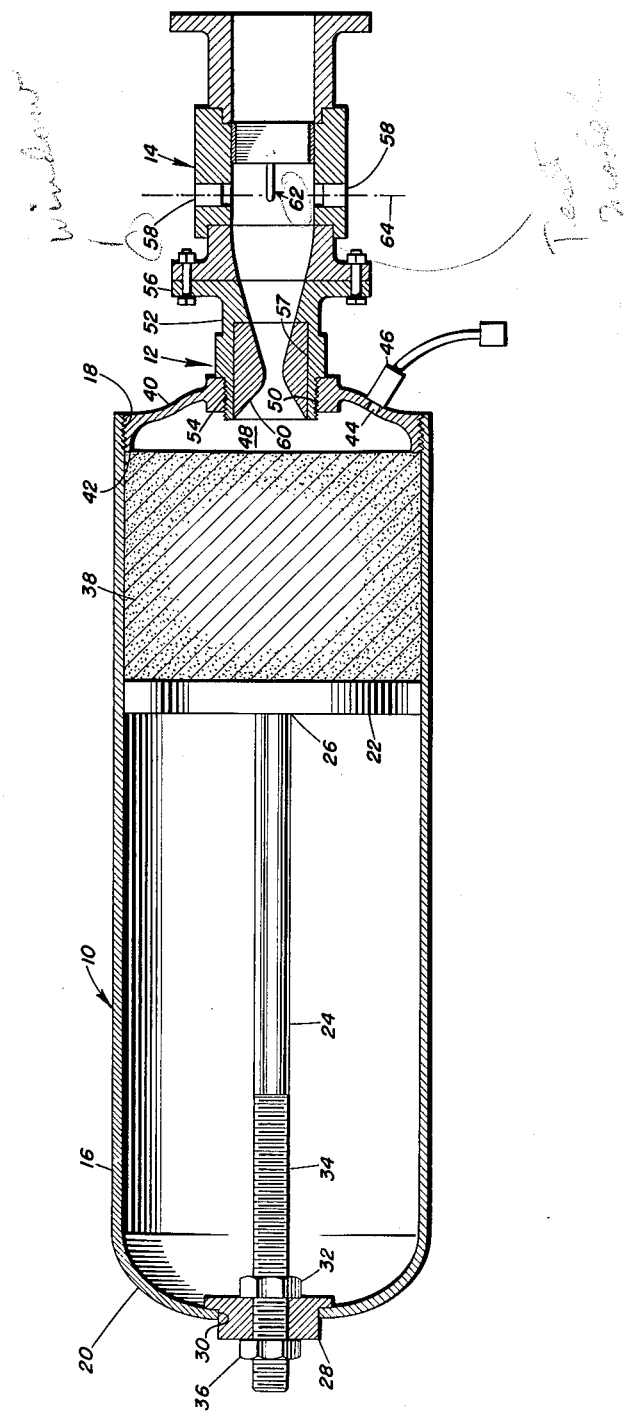

This invention relates generally to an aero-dynamic testing device and more specifically to a rocket excited supersonic wind tunnel.

Research in fluid dynamics in recent years has brought into prominence the need for a suitable mechanism with which to produce high-speed high-temperature fluid flow. Advances in missile performance have also brought forth a pressing demand for engineering and design information applicable to high-speed aerodynamics. The data available from hypersonic wind tunnels have provided significant results involving phenomena associated with high Mach numbers, low densities, viscosity changes, nonideal gas properties, and certain aspects of heat transfer. However, because of the limitations of conventional heating methods, all the continuous flows produced have been confined to relatively low rates of heat transfer or to low thermal levels. On the other hand, shock-tube and ballistic-range techniques have been successful in producing, for very short times (of the order of microseconds or milliseconds) very high fluid temperatures and heat-transfer rates. While this method of flow simulation provides data on excitation phenomena, transient thermal behavior, and other physical processes requiring short time scales, it does not permit thermal equilibrium to be established between the model and the surrounding flow, and hence within the flow itself. Shock tubes, shock tunnels, ballistic ranges and present day hypersonic tunnels do not meet the exacting conditions needed to simulate and study the flow properties of high-speed flight.

Hypersonic wind tunnels are limited by the supply temperature at which they operate since the high flow velocities attained in their test sections are produced by an expansion process. For the equipment in general use today, the supply temperature is near 1800° R. Conversion of this thermal energy into kinetic energy of the stream may produce a maximum velocity of 4000 ft./sec. Mach numbers above four are produced by allowing the expansion to proceed to very low temperatures so that the velocity of sound is reduced by a factor of two to three compared to atmospheric conditions.

Conventional methods of direct heating or storage heating may be used for higher temperature by resorting to special materials and insulating arrangements enabling temperatures of the order of 3500° R. to be attained. If advantage is taken of adiabatic compression, the final temperatures may be raised by a factor of two or more.

The present invention utilizes the products of combustion from a propellant grain to obtain a high-pressure, high-temperature gas at a high rate sufficient to produce thermal equilibrium between the model and the surrounding flow.

The primary object of the invention is to provide a supersonic speed wind tunnel which makes use of the gases of combustion from the burning of a combustible composition to produce a high Mach number fluid flow.

Another object of the invention is to provide a supersonic speed wind tunnel of the above type which provides a high-temperature fluid flow.

Another object of the invention is to provide a supersonic wind tunnel which produces thermal equilibrium between the model and the surrounding flow.

A further object is to provide a supersonic wind tunnel which is economical to use and extremely simple in arrangement.

A still further object is to provide a controlled high-velocity thermal-equilibrium flow, the aerodynamic properties of which may be preset, recorded, and minutely examined.

Other objects and many of the attendant advantages of this invention will be readily appreciated as the same becomes better understood by reference to the following detailed description when considered in connection with the accompanying drawing.

The single figure of the drawing is a section of the present invention taken along the longitudinal axis.

Briefly the invention comprises a rocket propellent housing, a nozzle section, and a test section. Upon ignition of a propellent grain within the housing, a high-speed high-temperature fluid flow will be produced in the nozzle section and due to its configuration a continuous supersonic flow will be attained in the test section.

In the drawing the wind tunnel is shown as comprising a rocket propellent housing 10, a nozzle section 12 and a test section 14. The housing 10 consists of a cylindrical steel container 16 having a threaded open end 18 and a closed end 20. Located within the container 16 is an adjustable bulkhead 22 which is rigidly attached to a rod 24 at 26. The rod 24 passes through a plug 28 set in an opening 30 in the closed end 20 of the container 16. A set nut 32 is located on the threaded end 34 of the rod 24 interiorly of the container 16 and a lock nut 36 is located on the rod 24 exteriorly of the container 16.

A solid propellent grain 38 is positioned adjacent the bulkhead or support 22 within the container 16. A closure member 40 is threaded into the open end 18 of the container 16 and a ridge or abutment 42 of the member 40 is seated against the propellent grain 38 to hold the propellant against the bulkhead 22. The closure member 40 is provided with an aperture 44 for a pressure gauge 46 and is designed to provide a combustion chamber 48 adjacent propellent grain 38. A centrally disposed opening 50 in the closure member 40 is threaded to receive the nozzle section 12.

The nozzle section 12 consists of a steel tube 52 threaded at one end 54 and having a flange 56 at the opposite end. A recess 57 is provided in the threaded end of tube 52 to support a nozzle insert 60. The nozzle insert 60 is made of either carbon or molybdenum and may be water cooled. The threaded end 54 of the tube 52 is screwed into the central opening 50 of member 40 so that the nozzle is in communication with the combustion chamber 48.

The test section 14 is attached to the flange 56 and is provided with viewing windows 58 of fuzed silica. The test model is shown generally at 62. A direct in-line schlieren system (not shown) is set up on center line 64 to record the model flow patterns.

In operation the bulkhead 22 is preset by set nut 32 according to the size of propellent grain 38 to be used and lock nut 36 is drawn up tight. The propellent grain 38 is inserted through the open end 18 of container 16 and closure member 40 is screwed into the open end 18 until ridge 42 is seated against the propellent grain 38. The nozzle section and test section are then secured to the closure member 40. The propellent grain 38 is ignited by a black-powder bag (not shown) containing an electrically activated firing cap. Upon ignition of the propellent grain 38, a high pressure-high temperature gas is produced in the combustion chamber 48, which will result in a high speed fluid flow through the nozzle section 12 and the test section 14. The flow velocity of the gas in the test section may be increased by expanding the gas to ambient temperature through a properly designed diffuser or auxiliary exhaust system.

Obviously many modifications and variations of the present invention are possible in the light of the above teachings. It is therefore to be understood that within the scope of the appended claims the invention may be practiced otherwise than as specifically described.

What is claimed is:

1. A rocket excited wind tunnel, comprising; a cylindrical rocket propellant container having an open end and a closed end, axially adjustable support means mounted within said container, removable closure means for closing the open end of said container, said removable closure means having axially extending abutment means fitted within said container, a rocket propellant grain positioned within said container and securely held between said support means and said abutment means, a convergent-divergent nozzle having an upstream end and a downstream end mounted centrally in said removable closure means and extending axially of said container, and a test section having an axially extending bore attached to said nozzle means at the downstream end thereof so that a closed passageway is provided from the container to the bore of said test section.

2. A rocket excited wind tunnel, comprising; a cylindrical rocket propellant container having an open end and a closed end, a rocket propellant grain positioned within said container, a removable closure means for closing the open end of said container, said removable closure means having a centrally disposed aperture, a removable nozzle section secured in said centrally disposed aperture and extending axially of said container, said nozzle section having an annular recess in the upstream end extending axially thereof, a convergent-divergent nozzle insert removably fitted in said recess, a test section attached to the downstream end of said nozzle section and having a bore extending axially thereof, and conduit means connecting said bore and said nozzle insert so that a closed passageway is provided from said container to the bore of said test section.

3. A rocket excited wind tunnel according to claim 2, including additionally an axially adjustable support means mounted within the container, and axially extending abutment means on said removable closure means fitted within said container, whereby the rocket propellant grain is securely held between said support means and said abutment means.

References Cited in the file of this patent

UNITED STATES PATENTS

| | | |
|---|---|---|
| 2,515,069 | Zola | July 11, 1950 |
| 2,712,283 | Golden | July 5, 1955 |
| 2,762,193 | Johnson | Sept. 11, 1956 |
| 2,805,571 | Graham | Sept. 10, 1957 |
| 2,819,423 | Clark | Jan. 7, 1958 |

FOREIGN PATENTS

| | | |
|---|---|---|
| 691,953 | Great Britain | May 27, 1953 |